United States Patent
Saito et al.

(10) Patent No.: US 6,454,984 B1
(45) Date of Patent: Sep. 24, 2002

(54) MOLDING DIE OF LAMINATED MOLDING AND MANUFACTURING METHOD OF LAMINATED MOLDING

(75) Inventors: Yoshiaki Saito, Ichihara (JP); Tomokazu Abe, Ichihara (JP); Terunobu Fukushima, Maebashi (JP)

(73) Assignees: Idemitsu Petrochemical Co., Ltd., Tokyo (JP); Sanwakako Co., Ltd., Maebashi (JP)

( * ) Notice: Subject to any disclaimer, the term of this patent is extended or adjusted under 35 U.S.C. 154(b) by 0 days.

(21) Appl. No.: 09/423,588

(22) PCT Filed: Mar. 11, 1999

(86) PCT No.: PCT/JP99/01173
§ 371 (c)(1),
(2), (4) Date: Nov. 9, 1999

(87) PCT Pub. No.: WO99/46107
PCT Pub. Date: Sep. 16, 1999

(30) Foreign Application Priority Data

Mar. 12, 1998 (JP) .............................................. 10-061161

(51) Int. Cl.$^7$ ......................... B29C 33/12; B29C 45/14; B29C 45/56

(52) U.S. Cl. ...................... 264/261; 264/266; 264/275; 264/277; 264/328.7; 425/112; 425/123; 425/125; 425/577

(58) Field of Search .................................. 264/250, 255, 264/266, 328.8, 328.9, 328.12, 328.7, 259, 261, 275, 277, 278; 425/129.1, 125, 577, 112, 116, 123

(56) References Cited

U.S. PATENT DOCUMENTS

| 4,670,199 A | * | 6/1987 | Montet et al. ............... 264/255 |
| 4,840,760 A | * | 6/1989 | Oishi ....................... 264/328.8 |
| 4,994,226 A | * | 2/1991 | Nakagawa et al. .......... 264/263 |
| 5,254,306 A | * | 10/1993 | Inada et al. ................. 264/255 |
| 5,409,659 A | * | 4/1995 | Matsumoto et al. ......... 425/130 |
| 5,433,910 A | * | 7/1995 | Mukai et al. ................ 425/130 |
| 5,690,881 A | * | 11/1997 | Horie et al. ................. 264/263 |
| 5,858,420 A | * | 1/1999 | Szajak et al. ................ 425/557 |

FOREIGN PATENT DOCUMENTS

| JP | 58-81137 | 5/1983 |
| JP | 1-267015 | 10/1989 |
| JP | 3-60297 | 9/1991 |
| JP | 4-9148 | 3/1992 |
| JP | 5-83056 | 11/1993 |
| JP | 6-238706 | 8/1994 |
| JP | 8-309786 | 11/1996 |

* cited by examiner

*Primary Examiner*—Angela Ortiz
(74) *Attorney, Agent, or Firm*—Flynn, Thiel, Boutell & Tanis, P.C.

(57) ABSTRACT

A molding die 1 for molding a laminated molding having a molding body with compressible surface members 23 and 24 partially laminated thereonto, where a flow-regulating portion for regulating flow of molten resin flowing toward the surface members 23 and 24 is provided to a die body 10 to regulate the flow of the molten resin flowing on the same plane as the surface members 23 and 24 toward the surface members 23 and 24. Accordingly, since resin lap at an peripheral end portion of the surface members 23 and 24, and position shift of the surface members 23 and 24 by the flow of the resin, laminated molding having good quality and appearance can be obtained.

17 Claims, 12 Drawing Sheets

F I G. 8
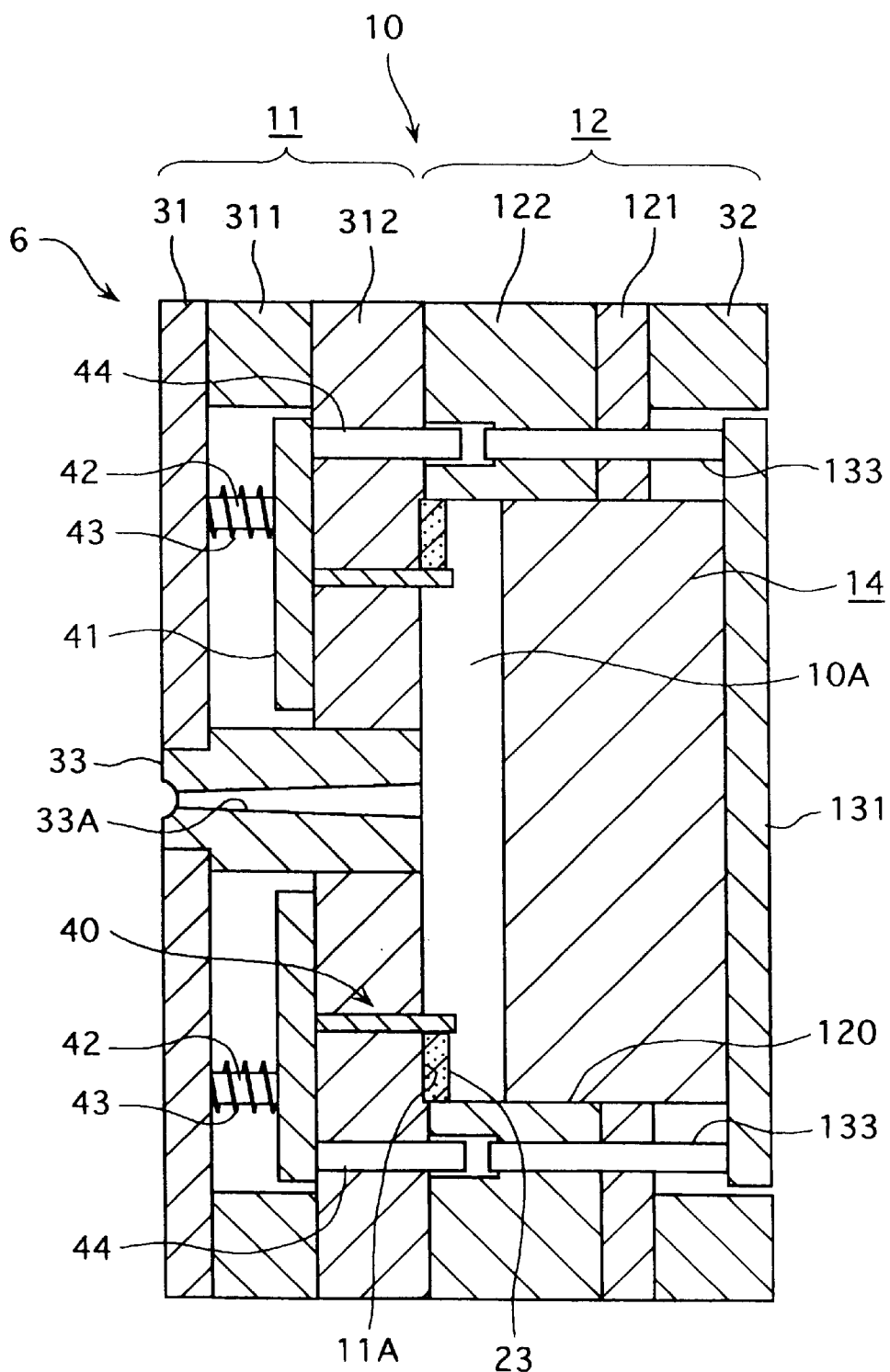

MOLDING DIE OF LAMINATED MOLDING AND MANUFACTURING METHOD OF LAMINATED MOLDING

TECHNICAL FIELD

The present invention relates to a molding die of a laminated molding and manufacturing method of the laminated molding. More specifically, the present invention relates to a molding die of laminated molding having molding body made of synthetic resin with compressible surface member laminated thereto, and a manufacturing method of the laminated molding.

BACKGROUND ART

Conventionally, products made of synthetic resin are used for interior goods of an automobile, electric appliance components, household commodities etc.

Among the synthetic-resin-made products, an air-current control valve of an air conditioner for an automobile has flexible and compressible surface member for securing sealability thereof. Further, frame-shaped surface member as a sealing member is provided around an opening of an air-cleaner case for an automobile and peripheral portion of an inside of a refrigerator door in order to enhance air-tightness thereof Such moldings having synthetic-resin-made molding body as a base and surface member integrated thereto can be manufactured by following methods:

(1) Attaching the surface member by adhesive or the like onto a surface of a molding body manufactured in advance by injection molding method or the like.

(2) Utilizing injection-molding method, where molten resin is injected into a die for molding the molding body integrally with the surface member after closing the die with the surface member being disposed therein (Japanese Patent Application Laid-open No. Hei 3-60297).

(3) Utilizing injection press molding method, where the surface member is disposed inside the die, and the molten resin is filled inside the die and is compressed by closing and clamping the die (Japanese Patent Application Laid-open No. Hei 5-83056).

(4) Enlarging clearance at a portion where the surface member is disposed in the internal space of the die (cavity) and providing a plurality of gate facing the enlarged portion. In molding the products, the surface member is disposed at the enlarged portion and molten resin is injected from the plurality of gate passing through the surface member to mold the molding body integrally with the surface member while controlling the molten resin flow (Japanese Patent Publication Laid-Open No. Hei 8-309786).

However, following disadvantages could occur according to the above methods.

According to the above (1) method, since the surface member has to be attached after shaping the molding products, lot of work is required and the productivity can be lowered.

According to method (2) and (3), since the surface member can be integrated simultaneously with the shaping step, the productivity can be enhanced.

However, when a surface member, especially compressible surface member such as polyurethane foamed sheet is partially laminated to the molding body, the molten resin flows toward a peripheral side of the surface member which is not abutted to inner surface of the die, i.e. exposed end of the surface member. Accordingly, the end of the surface member is likely to be caught in the molten resin, that is, the end of the surface member is turned over by the molten resin flow or buried in the resin and the entire surface member can cause position shift by being pushed off by the molten resin, thereby spoiling quality and appearance of the laminated moldings.

Since the method (4) is a multiple-gate type, molding failure such as weld mark and scorch is likely to be generated. And since the portion having the surface member of the molding body is made thick by enlarging inner space of the die, much resin is required thus being uneconomical, and generation of deformation and prolonged cooling time can be caused.

DISCLOSURE OF THE INVENTION

An object of the present invention is to provide a molding die of laminated molding and a manufacturing method of the laminated molding, where good quality and appearance can be obtained while improving productivity of the laminated molding and preventing molding failure.

The present invention is a molding die of a laminated molding for manufacturing a laminated molding having a molding body made of synthetic resin with a compressible surface member partially laminated thereonto. The present invention is characterized in having: a die body having a cavity for molding the laminated molding and being capable of attaching the surface member thereinside; a slide die structuring the die body and being advanceable and retractable relative to the cavity; and a flow-regulating portion provided to the die body for regulating a flow of a molten resin flowing toward the surface member.

In the present invention, since the flow-regulating portion for regulating the flow of the molten resin is provided to the die body, the molten resin can be prevented from directly flowing toward peripheral side of the surface member by making the flow-regulating portion regulate the flow of the molten resin flowing toward the surface member on the same plane as the surface member.

Accordingly, resin lap where the peripheral end of the surface member is turned over or buried in the resin by the flow of the molten resin, or position shift of the surface member by the resin flow can be prevented, thereby obtaining laminated moldings having good quality and appearance.

Further, since the flow of the molten resin can be controlled by the flow-regulating portion, it is not required to enlarge the portion of the cavity corresponding to the surface member as in the conventional method (method (4)), so that the portion of the molding body having the surface member laminated thereto can be prevented from being thick, thereby being economical for requiring fewer resin amount and being capable of preventing increase in cooling time and deformation of the molding body caused for becoming too thick.

Further, since a laminated molding having good quality can be obtained without employing multiple-gate method, molding failure such as weld mark and scorch can be prevented.

Since the surface member can be integrated simultaneously with the molding process of the molding body, the process for attaching the surface member can be omitted, thereby improving productivity.

Further, since the die body includes the slide die advanceable and retractable relative to the cavity, the resin pressure applied to the surface member can be lowered by retracting the slide die in filling the molten resin to prevent the molten resin from excessively permeating into the surface member, thereby preventing failures such as the surface member being fixed in a compressed condition and reducing damage caused on the surface member by the resin pressure.

Since the molten resin can be securely spread (filled) within the entire cavity by advancing the slide die after initiating to fill the molten resin, thereby obtaining molding body corresponding to the cavity configuration.

Foamed sheet made of resin such as polyurethane, polypropylene, polyethylene, laminated sheet having facing member such as other film integrated on at least one side of the foamed sheet etc. can be suitably used as the surface member.

The facing member to be integrated may be resin sheet or resin film made of PVC (polyvinyl chloride), thermoplastic elastomer etc., woven fabric and non-woven fabric.

The synthetic resin structuring the molding body as a base of the surface member may be thermoplastic resin such as polypropylene, polystyrene, polyethylene, ABS, polycarbonate, and compound of the thermoplastic resin with various additives.

The additives may be filler such as talc, mica, glass fiber, stabilizer for preventing deterioration by heat and light, coloring agent and so on.

In the above arrangement, the flow-regulating portion may preferably includes a plate-shaped flow-regulating plate, the flow-regulating plate being protrudable relative to the cavity.

By structuring the flow-regulating portion with the plate-shaped flow-regulating plate, the molten resin flowing toward the surface member can be introduced in a desired direction, thereby securely controlling the flow of the molten resin.

Since the flow-regulating plate is protrudable relative to the cavity, no recessed portion by the flow-regulating plate can be generated to the molding body by sinking the flow-regulating plate after the flow of the molten resin is decreased, thereby obtaining superior strength and appearance.

In this case, the flow-regulating plate is preferably continuously formed along a portion of a peripheral side of the surface member being exposed in the cavity.

Especially, the flow-regulating plate is preferably provided along a portion of the peripheral side of the surface member to be upstream of the molten resin flowing during injection.

In other words, since the resin lap at the peripheral end of the surface member and the position shift of the surface member is caused by the flow of the molten resin at the exposed portion of the peripheral side of the surface member, the peripheral side of the surface member can be covered by the die body and the flow-regulating plate by providing the flow-regulating plate along the exposed portion to be shut by the flowing molten resin, thereby further securely preventing the resin lap at the peripheral end of the surface member and the position shift of the surface member.

When the surface member is formed in a frame-shape, the flow-regulating plate is preferably provided along an inner peripheral side of the surface member.

Accordingly, the resin lap at the inner peripheral end of the surface member can be securely prevented even when the molten resin flows around inside the frame-shaped surface member.

When the surface member is formed in a frame-shape and is attached to a molding surface of the slide die, the slide die may preferably be formed in a frame-shape corresponding to the surface member, and an inner portion of the slide die of the die body may preferably structures the flow-regulating portion.

By forming the slide die in a frame-shape corresponding to the surface member, the surface member attached to the molding surface is sunk from the cavity so that the inner peripheral side of the surface member is covered by the inner portion of the slide die by retracting the slide die, thereby shutting the inner peripheral side of the surface member from the flowing molten resin.

Accordingly, since the portion to be the inner side of the slide die of the die body can also be used as the flow-regulating portion, no special structure is necessary for forming the flow-regulating portion, thereby simplifying the arrangement of the die body.

Alternatively, when the surface member is formed in a frame-shape to be attached to surround the slide die, the slide die may be formed in a block-shape corresponding to an opening of the surface member, the slide die structuring the flow-regulating portion.

In other words, by forming the slide die in a block-shape corresponding to the opening of the surface member, the peripheral side of the surface member attached surrounding the slide die can be covered by the slide die when the slide die is advanced, thereby shutting the peripheral side of the surface member from the flowing molten resin.

Accordingly, since the slide die itself can be used as the flow-regulating portion and no special structure for forming the flow-regulating portion is required, the arrangement of the die body can be simplified.

Another aspect of the present invention is a molding method for shaping a laminated molding having a molding body made of synthetic resin and a compressible surface member partially laminated thereto. The method includes the steps of: providing a molding die including a die body having a cavity thereinside for molding the laminated molding, a slide die structuring the die body and being advanceable and retractable relative to the cavity and a flow-regulating portion provided to the die body and for regulating a flow of a molten resin flowing toward the surface member; attaching the surface member to an inner surface of the die body; initiating injection of the molten resin to the cavity; and subsequently, advancing the slide die relative to the cavity.

In the present invention, the molten resin is injected to the cavity after attaching the surface member to the die body, the injected molten resin is flown and dispersed in the cavity, and is spread around the surface member.

At this time, as described above, since the die body has the flow-regulating portion, the flowing direction of the surface member can be restricted by the flow-regulating portion to be prevented from flowing toward the peripheral side of the surface member by providing the flow-regulating portion to regulate the flow of the molten resin flowing toward the surface member on the same plane as the surface member. Accordingly, the resin lap at the end portion of the surface member and the position shift of the surface member can be prevented, thereby obtaining laminated moldings having good quality and appearance.

Incidentally, the molten resin may flow beyond the flow-regulating portion in either injecting process or compressing process by advancing the slide die.

Since the flow-regulating portion allows to control the flow of the molten resin without enlarging the portion corresponding to the surface member in the cavity, the molding body can be prevented from being too thick, thereby preventing increase of resin amount, increase of cooling time and deformation of the molding body.

Further, since the laminated moldings with good quality can be obtained without employing multiple-gate method, molding failure such as weld mark and scorch can be prevented from generation.

After initiating injection of the molten resin, the slide die is advanced to reduce the cavity.

Since the cavity is enlarged before advancement of the slide die, the resin pressure applied to the surface member can be set low so that the molten resin can be prevented from excessively permeating in the surface member, thereby preventing failure such as fixing the surface member while being compressed.

Since the molten resin in the cavity is compressed by advancing the slide die, the molten resin can be completely spread in the cavity, thereby obtaining molding body corresponding to cavity configuration.

By solidifying the molten resin, the molding body having configuration corresponding to the cavity can be obtained and the surface member is integrated to the molding body.

Accordingly, the surface member can be integrated simultaneously with formation of the molding body, thereby achieving improved productivity.

In the above arrangement, simultaneously with advancing the slide die to the cavity, the flow-regulating portion is preferably retracted relative to the cavity.

Accordingly, no recessed portion by the flow-regulating portion is formed on the molding body, thereby obtaining good appearance.

BRIEF DESCRIPTION OF DRAWINGS

FIG. 8 is a cross section showing third embodiment of the present invention;

BEST MODE FOR CARRYING OUT THE INVENTION

Respective preferred embodiments of the present invention will be described below with reference to attached drawings.

[First Embodiment]

Figure 1:
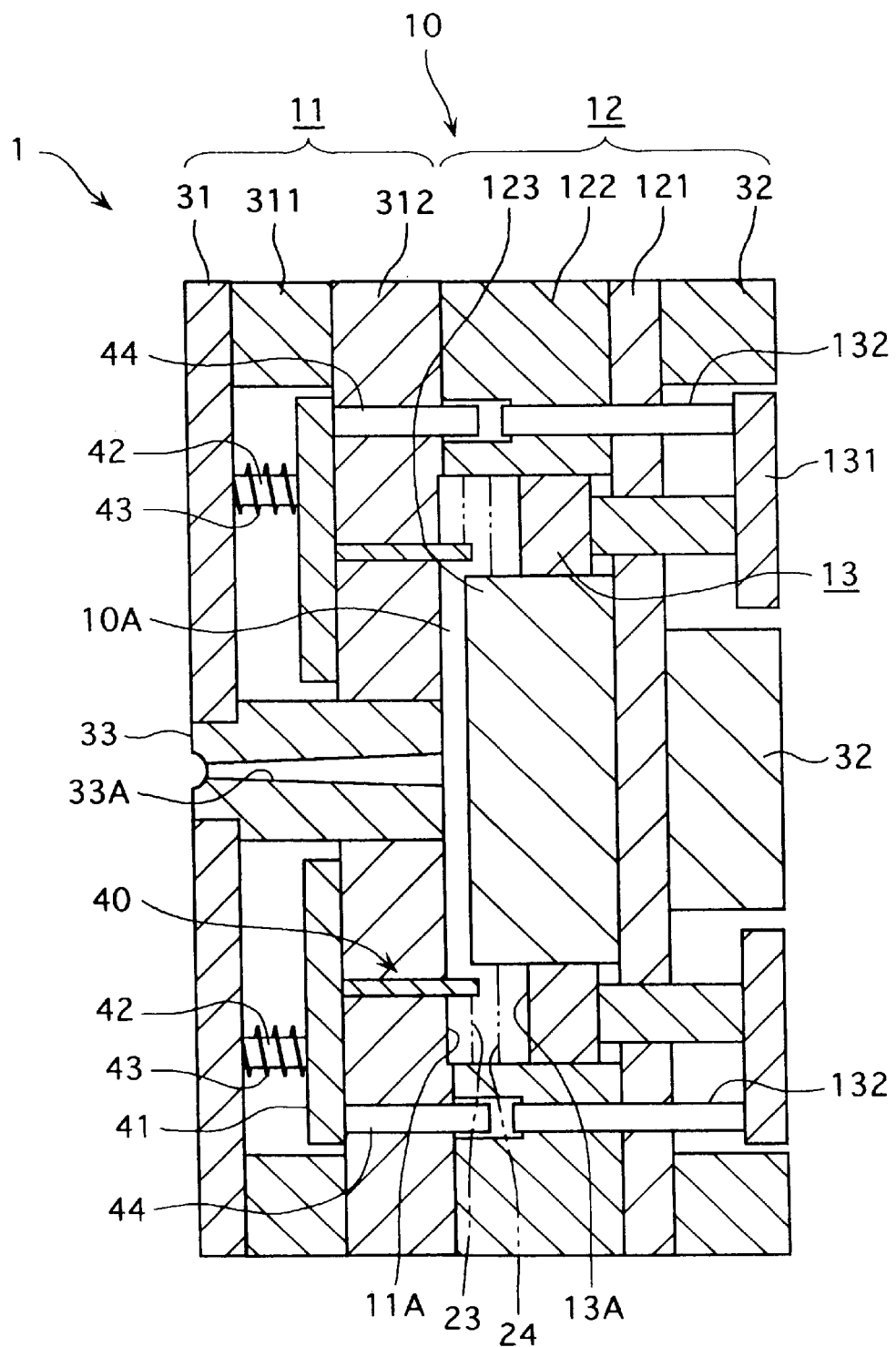
FIG. 1 is a cross section showing first embodiment of the present invention.

FIG. 1 shows a molding die 1 according to the present embodiment.

Figure 2:
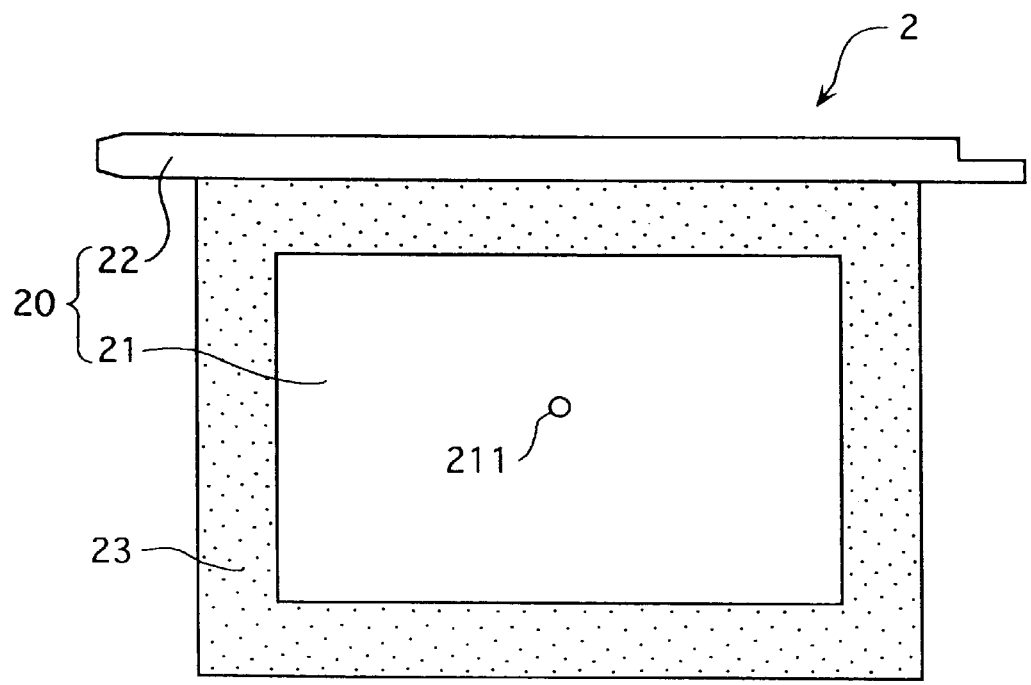
FIGS. 2(A) and 2(B) is a top plan view and a cross section showing laminated molding according to the first embodiment.
Figure 2:
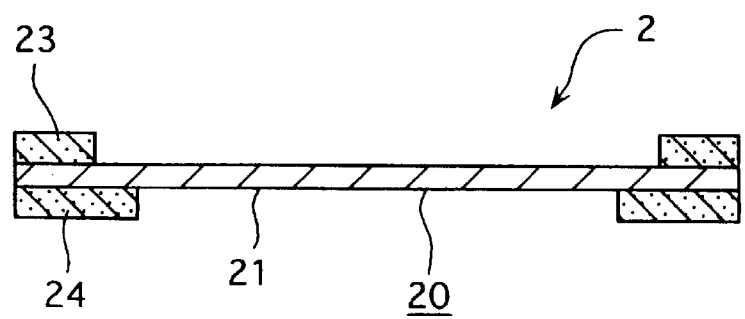

The molding die 1 of the present embodiment is, as shown in FIG. 2, for shaping a laminated molding 2 having a molding body 20 made of synthetic resin and surface members 23 and 24 partially laminated to both sides of the molding body 20.

Specifically, the laminated molding 2 is an air-current control valve to be installed in a duct (not shown) to open and close the duct for circulating air etc., which has a rectangular plate-shaped valve body 21 and a rotation shaft 22 provided along a side of the valve body 21 to open and close the duct (not shown) by turning around the rotation shaft 22.

On both sides of the valve body 21, the surface members 23 and 24 are laminated in a frame-shape in order to secure air-tightness.

The surface members 23 and 24 are formed in a rectangular plate-shape corresponding to the valve body 21, which is made of a compressible material such as elastically deformable flexible material, e.g., polyurethane formed sheet.

Incidentally, a gate trace 211 where the molten resin is injected during molding process is left on one side of the valve body 21.

Back to FIG. 1, the molding die 1 has an openable die body 10.

The die body 10 has a stationary die 11, a movable die 12 advanceable and retractable relative to the stationary die 11 and a frame-shaped slide die 13 provided within the movable die 12, and a cavity 10A for molding the laminated molding 2 is formed therein when being closed.

The stationary die 11 has a stationary platen 31 attached with a stationary die plate 312 through a spacer 311, the stationary die plate 312 forming the cavity 10A.

The stationary die plate 312 and the stationary platen 31 has a sprue bush 33 penetrating respective central portion thereof, the sprue bush 33 forming a sprue 33A for introducing the molten resin into the cavity 10A. The sprue 33A according to the present embodiment has an opening at the central portion of the cavity 10A.

Peripheral portion of the molding surface of the stationary die 11 (stationary die plate 312) is an attachment surface 11A for attaching the first surface member 23 to be laminated onto a side of the valve body 21 (see FIG. 2). An inner end of the frame-shaped first surface member 23 is exposed to the cavity 10A.

A plate-shaped flow-regulating plate 40 is provided to the stationary die 11 to cover an inner end of the first surface member disposed to the attachment surface 11A, the flow-regulating plate 40 partitioning the attachment surface 11A on the molding surface. When the first surface member 23 is to be attached to the attachment surface 11A, the first surface member 23 is fitted to a portion surrounded by the flow-regulating plate 40 and the molding surfaces of the dies 11 and 12 to be held thereon.

The flow-regulating plate 40 is provided continuously along the inner peripheral end of the attachment surface 11A to regulate the flow of the molten resin flowing toward an end of the first surface member 23 on the same plane as the first surface member 23.

In the present embodiment, the flow-regulating plate 40 composes a flow-regulating portion for regulating the flow of the molten resin which flows toward the first surface member 23.

The flow-regulating plate 40 passes through the stationary die plate 312 and is connected to a stationary-side advancing plate 41 provided between the stationary platen 31 and the stationary die plate 312 to be protrudable to the cavity 10A.

The stationary-side advancing plate 41 is provided parallel to the stationary die plate 312, which slides between the stationary die plate 312 and the stationary platen 31 along the slide shaft 42 penetrating the plate 41. accordingly, the flow-regulating plate 40 protrudes and recedes relative to the cavity 10A in accordance with the slide (advancement and retraction) of the stationary-side advancing plate 41

The flow-regulating plate 40 protrudes farthest from the stationary die 11 into the cavity 10A when the stationary-side advancing plate 41 is abutted to the stationary die plate 312. In other words, the stationary-side advancing plate 41 is a stopper for regulating the advancement width of the flow-regulating plate 40.

A spring 43 is wound around a portion of the slide shaft 42 between the stationary-side advancing plate 41 and the stationary platen 31, thereby biasing the stationary-side advancing plate 41 to be pressed onto the stationary die plate 312.

Retracting rods 44 for sliding the stationary-side advancing plate 41 to the stationary platen 31, i.e. retracting toward the stationary die plate 312, are provided to the stationary-side advancing plate 41. The retracting rods 44 pass through the stationary die plate 312.

On the other hand, the movable die 12 has a movable backing plate 121, a frame-shaped movable peripheral die plate 122 attached to a peripheral portion of a side of the movable backing plate 121 facing the stationary die 11, and an approximately rectangular-solid-shaped movable central die plate 123 attached to a central portion of the movable backing plate 121, which is connected to an advancing mechanism (not shown) for opening and closing the die through a die attachment base 32 mounted to the movable backing plate 121.

The aforesaid slide die 13 is provided in a frame-shape to the frame-shaped portion between the movable peripheral die plate 122 and the movable central die plate 123. The frame-shaped molding surface is an attachment surface 13A for attaching a second surface member 24 laminated on the other side of the valve body 21.

The slide die 13 is provided advanceably toward the cavity 10A, and is, specifically, connected to a movable-side advancing plate 131 provided parallel to the movable backing plate 121.

The movable-side advancing plate 131 advances and retracts parallel to the advancing direction of the movable die 12 by an advancing mechanism (not shown) and the slide die 13 advances and retracts interlocking with the advancement and retraction of the movable-side advancing plate 131.

When the movable-side advancing plate 131 is retracted, the attachment surface (molding surface) 13A of the slide die 13 sinks beneath the molding surface of the movable die 12 (movable central die plate 123). The second surface member 24 is fittably attached to a portion surrounded by the movable peripheral die plate 122 and the movable central die plate 123.

In other words, when the slide die 13 is retracted, the second surface member 24 attached to the attachment surface 13A sinks into the movable die 12 and the peripheral side is covered by the movable peripheral die plate 122 and the movable central die plate 123. Accordingly, the flow of the molten resin flowing toward the second surface member 24 on the same plane as the second surface member 24 is regulated by the movable die 12.

As described above, in the present embodiment, the flow-regulating portion for regulating the flow of the molten resin flowing toward the second surface member 24 is constructed of movable die 12, more specifically, movable central die plate 123 on an inside the slide die 13 and the movable peripheral die plate 122 on an outside of the slide die 13.

Further, the movable-side advancing plate 131 has a pushing rod 132 provided on the same axial line as the retracting rod 44 of the stationary die 11. When the movable-side advancing plate 131 is retracted relative to the movable die 12, the pushing rod 132 and the retracting rod 44 are spaced apart.

By advancing the movable-side advancing plate 131 from the above condition, the retracting rod 132 is retracted to a direction sinking (being spaced apart) from the stationary die plate 312 by being pushed toward the stationary platen 31, thereby retracting the stationary-side advancing plate 41 to sink the flow-regulating plate 40 relative to the stationary die plate 312.

In thus arranged present embodiment, the laminated molding 2 is manufactured according to following steps.

The movable die 12 is retracted relative to the stationary die 11 to open the die body 10 and, simultaneously, the slide die 13 is retracted relative to the movable die 12 by an advancing mechanism (not shown) to sink the attachment surface 13A of the slide die 13 by a depth more than the thickness of the second surface member 24 from the molding surface of the movable die 12.

At this time, the stationary-side advancing plate 41 is pressed toward the stationary die plate 312 by a biasing force of the spring 43 to protrude the flow-regulating plate 40 from the molding surface of the stationary die plate 312 by a thickness more than the first surface member 23.

The first surface member 23 is fitted to the attachment surface 11A partitioned by the flow-regulating plate 40 and the second surface member 24 is fitted to the attachment surface 13A of the slide die 13 partitioned by the movable die 12.

Incidentally, the first and the second surface members 23 and 24 may be fixed to the attachment surfaces 11A and 13A by various fixing means such as a needle or vacuum devices.

Next, the die body 10 is closed to be clamped by advancing the movable die 12 toward the stationary die 11. Accordingly, a cavity 10A slightly larger by an advancement amount of the slide die 13 than the shape of the laminated molding 2 is formed inside the die body 10.

Subsequently, the molten resin is injected into the cavity 10A by an injecting apparatus (not shown) through the sprue 33A.

Figure 3:
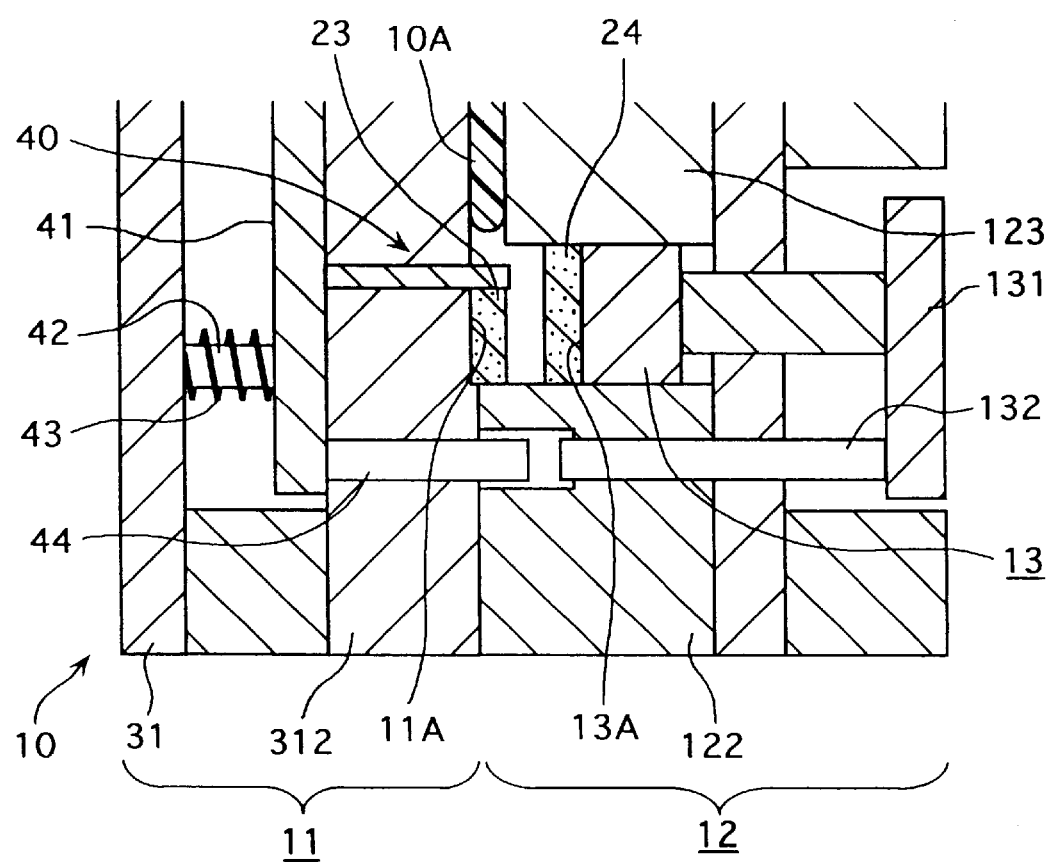
FIG. 3 is a partial cross section showing a condition where resin is injected in the first embodiment.
Figure 4:
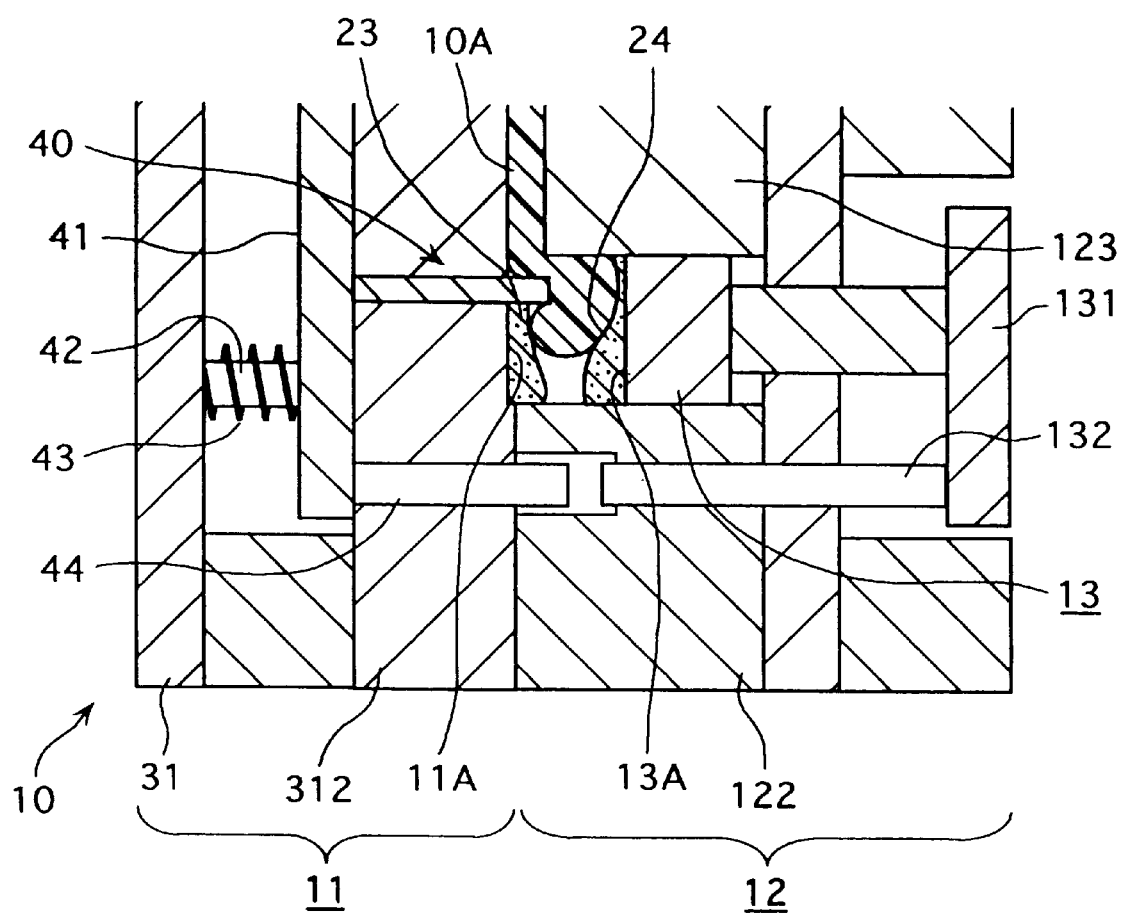
FIG. 4 is a partial cross section showing a flow condition of the molten resin in the first embodiment.

At this time, as shown in FIG. 3, the molten resin advances from a central portion of the cavity 10A to the first and the second surface members 23 and 24 at the outer periphery to flow over as shown in FIG. 4, the flow-regulating plate 40 into the surface of the first surface member 23 (surface opposite to the second surface member 24) and to flow to the surface of the second surface member 24 (surface opposing the first surface member 23) of the slide die 13 from the molding surface of the movable central die plate 123.

In other words, the molten resin flows into a space between the mutually opposing first and second surface members 23 and 24 and the first and the second surface members 23 and 24 are pushed by the resin pressure toward the attachment surfaces 11A and 13A to be compressed.

At this time, the peripheral sides of the first and the second surface members 23 and 24 are covered by the stationary die plate 312, the flow-regulating plate 40, the movable peripheral die plate 122 and the movable central die plate 123 to be shut from the flow of the molten resin, so that the molten resin does not flow around the peripheral side of the first and the second surface members 23 and 24.

Figure 5:
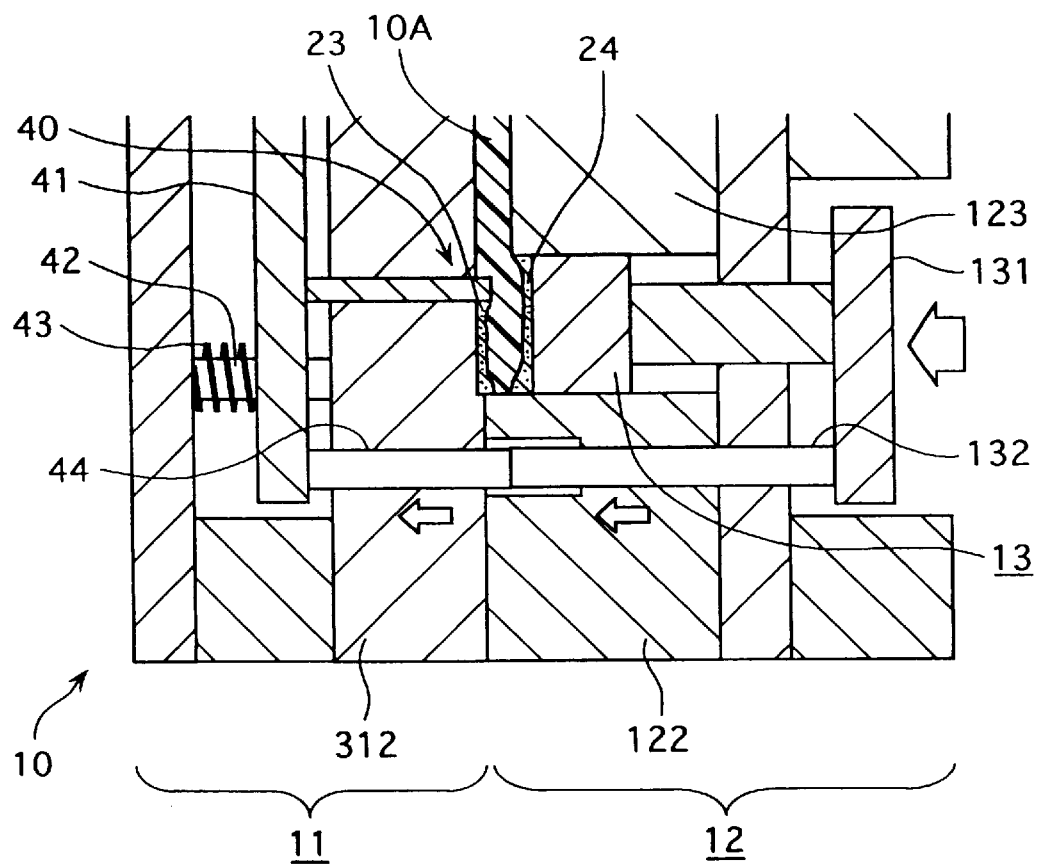
FIG. 5 is a partial cross section showing a condition where a slide die is advanced in the first embodiment.

At an approximately the same time period as completion of the molten resin, more specifically, either one of immediately before completion of injection or immediately after completion of injection, as shown in FIG. 5, the movable-side advancing plate 131 is advanced toward the stationary die 11 by an advancing mechanism (not shown) to advance the slide die 13 toward the cavity 10A, thereby compressing the molten resin to fill in the cavity 10A for rendering shape.

At this time, the pushing rod 132 is advanced together with the movable-side advancing plate 131 to be abutted the retracting rod 44. When the movable-side advancing plate 131 is further advanced, the retracting rod 44 is pressed by the pushing rod 132 to be retracted toward the stationary platen 31.

Interlocking with the retraction of the retracting rod 44, the stationary-side advancing plate 41 is moved toward the stationary platen 31, thereby retracting the flow-regulating plate 40 to sink into the cavity 10A.

Figure 6:
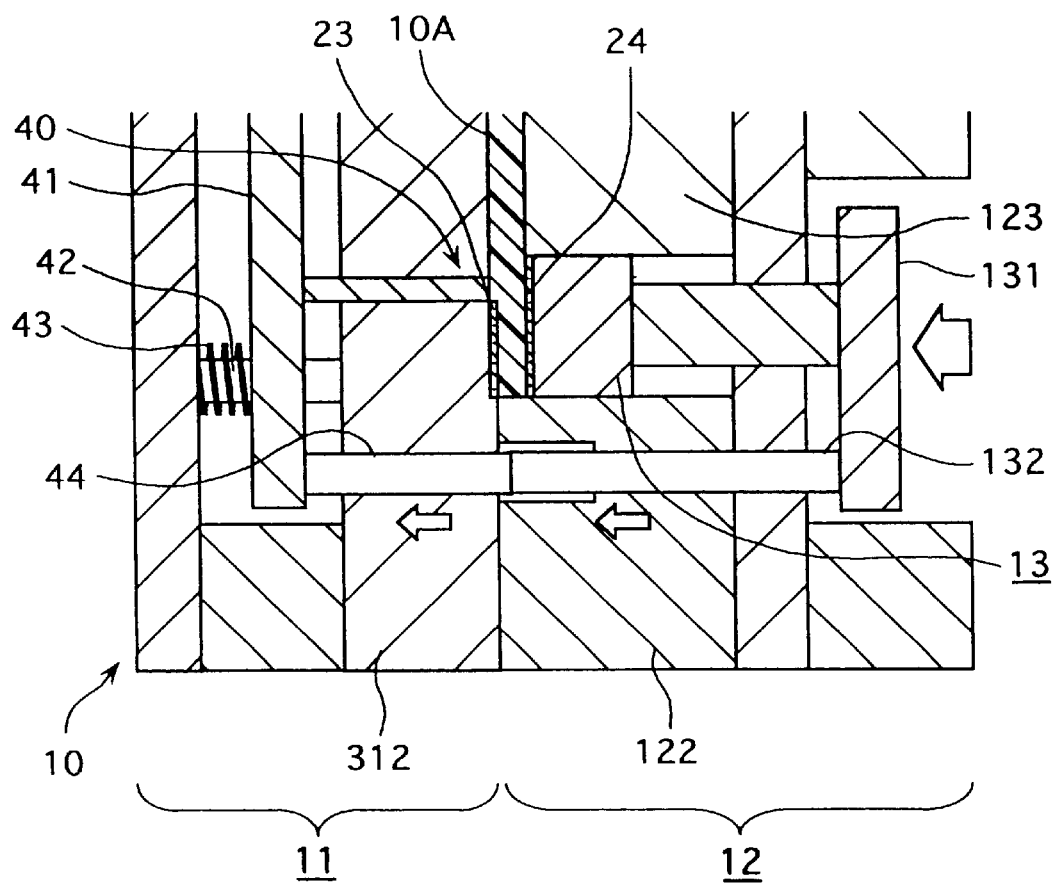
FIG. 6 is a partial cross section showing a condition where a slide die advancement is completed.

When the slide die 13 is advanced so that the cavity 10A becomes a shape corresponding to the laminated molding 2, distal end surface in an projecting direction of the flow-regulating plate 40 becomes flat with the molding surface of the stationary die plate 312 so that the portion where the flow-regulating plate 40 is projected is filled by the molten resin, as shown in FIG. 6.

At this time, when the flow-regulating plate 40 is retracted from the surface of the compressed first surface member 23 (surface opposite to the second surface member 24), the peripheral side of the first surface member is exposed. Fill and compression of the molten resin is almost completed at this moment and the molten resin is filled in the cavity 10A substantially not to flow in the cavity 10A. Therefore, the peripheral side of the first surface member 23 does not get involved in resin flow.

When the molten resin is cooled and solidified, the dies are opened by retracting the movable die 12, the molding body 20 (see FIG. 2) having surface members 23 and 24 integrated thereto is ejected from the die body 10.

At this time, the movable-side advancing plate 131 may be further advanced from a compressed condition to eject the product 2 by the slide die 13. Accordingly, the slide die 13 may also be used as an eject member.

The first and the second surface members 23 and 24 of the thus ejected laminated molding 2 returns to approximately the same configuration as a configuration before shaping from a condition compressed flat by a force against the compression (restoring force).

According to the present embodiment, following effects can be obtained.

Since the stationary die 11 (stationary die plate 312) has the flow-regulating plate 40 as a flow-regulating portion of the first surface member 23 and the flow-regulating portion of the second surface member 24 is composed of the movable die 12 (movable central die plate 123), the flow of the molten resin flowing toward the first and the second surface members 23 and 24 coplanarly with the first and the second surface members 23 and 24 can be regulated.

Therefore, when the molten resin is injected into the cavity 10A disposed with the first and the second surface members 23 and 24, the molten resin can be prevented from directly flowing toward the peripheral side of the first and the second surface members 23 and 24.

Accordingly, resin lap where the end portions of the first and the second surface members 23 and 24 are turned over or buried in the resin, and position shift of the first and the second surface members 23 and 24 by the resin flow can be prevented, thereby obtaining the laminated molding 2 having good quality and appearance.

Further, since the flow of the molten resin can be controlled by the flow-regulating plate 40 and the movable central die plate 123, the portion of the cavity corresponding to the surface member is not required to be enlarged as in the conventional arrangement. Therefore, since the portion of the molding body 20 having the first and the second surface members 23 and 24 being laminated can be prevented from becoming thick, economical manufacturing is possible by using fewer resin, and prolongation of the cooling time and deformation of the molding body 20 on account of being too thick can be prevented.

Since the laminated molding 2 having good quality can be obtained without employing multiple-gate method, molding failure such as weld mark and scorch can be prevented.

Since the first and the second surface members 23 and 24 can be integrated simultaneously with the molding body 20, the step for attaching the surface members can be omitted, thereby improving productivity.

Since the die body 10 includes the slide die advanceable and retractable relative to the cavity 10A and the slide die 13 is retracted at the initiation of filling the molten resin, the resin pressure applied to the first and the second surface members 23 and 24 can be lowered so that the molten resin can be prevented from excessively permeating into the first and the second surface members 23 and 24, thereby preventing failure where the first and the second surface members 23 and 24 are fixed in a compressed condition and decreasing damage applied to the first and the second surface members 23 and 24 caused by the resin pressure.

Since the molten resin can be securely spread (filled) in the entire cavity 10A by advancing the slide die 13 after initiation of filling the molten resin, the molding body 20 corresponding to the configuration of the cavity 10A can be obtained.

Since the flow-regulating portion of the first surface member 23 is composed of the plate-shaped flow-regulating plate 40, the molten resin flowing toward the first surface member 23 can be introduced in a desired direction along the flow-regulating plate 40, i.e. in a direction deviating from the peripheral side of the first surface member 23, the flow of the molten resin can be securely regulated.

Further, since the flow-regulating plate 40 is projectable relative to the cavity 10A, which is retracted in a sinking direction when the molten resin flow is reduced, more specifically, approximately at the same time as completion of the injection of the molten resin, a recessed portion by the flow-regulating plate 40 is not formed to the molding body 20, thereby obtaining superior strength and appearance.

Further, since the flow-regulating plate 40 is continuously provided along a portion of the inner peripheral side of the first surface member 23 exposed in the cavity 10A, the peripheral side of the first surface member 23 is covered by the die body 10 and the flow-regulating plate 40 so that the entire peripheral side can be shut from the resin flow, the resin lap and the position shift of the first surface member can be further securely prevented.

Since the flow-regulating plate 40 is provided along the inner peripheral side of the first surface member 23, the inner peripheral side of the first surface member 23 can be shut from the molten resin flowing inside the first surface member 23, thereby securely preventing resin lap at the inner end portion of the first surface member 23.

Since the slide die 13 is formed in a frame-shape corresponding to the first surface member 23, the peripheral side of the second surface member 24 can be covered by the movable die 12 by retracting the slide die 13 together with the second surface member 24, thereby shutting the peripheral side of the second surface member 24 from the resin flow by the movable die 12.

Accordingly, the movable die 12 can also be used as a flow-regulating portion by the advancement and the retraction of the slide die 13, no special arrangement is required for forming the flow-regulating portion, thereby simplifying the arrangement of the die body 10.

Since the movable-side advancing plate 131 connected to the slide die 13 and the stationary-side advancing plate 41 connected to the flow-regulating plate 40 are oppositely disposed and the retracting rod 44 and the pushing rod 132 are provided onto the advancing plates 131 and 41 along a line parallel to the advancing direction of the slide die 13 to retract the retracting rod 44 by the pushing rod 132 in accordance with the advancement of the slide die 13, the flow-regulating plate 40 can be retracted interlocking with the advancement of the slide die 13, thereby using the driving means of the slide die 13 also as a driving means of the flow-regulating plate 40.

Accordingly, no exclusive driving means for protruding and sinking the flow-regulating plate 40 is required, thereby simplifying the arrangement.

[Second Embodiment]

Figure 7:
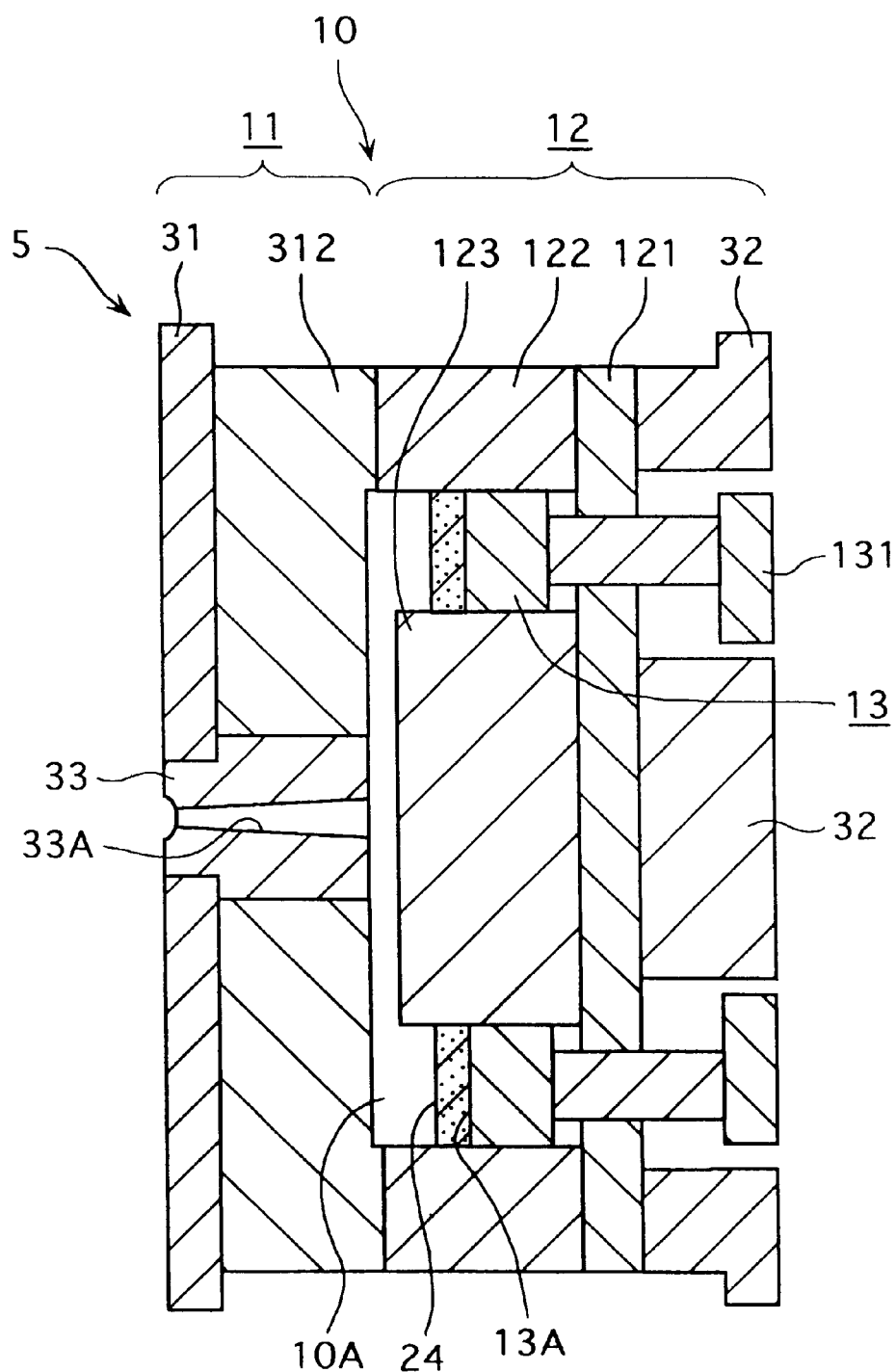
FIG. 7 is a cross section showing second embodiment of the present invention.

The flow-regulating plate 40 of the molding die 1 in the aforesaid first embodiment is omitted in a molding die 5 according to the present embodiment shown in FIG. 7. The same reference numerals as in FIG. 1 to 6 are attached to the same components to omit detailed explanation thereof and only different parts are described in detail in the following explanation.

The molding die 5 according to the present embodiment has no first surface member 23 of the laminated molding 2 shown in FIG. 2, i.e., the molding die 5 is for molding an air current valve (laminated molding) having only the second surface member 24 attached onto the molding body 20.

The stationary die plate 312 is directly attached to the stationary platen 31 and the flow-regulating plate 40, the stationary-side advancing plate 41, the slide shaft 42, the spring 43 and the retracting rod 44 (see FIG. 1) of the first embodiment are not provided.

Further, the movable-side advancing plate 131 has no pushing rod 132 according to the first embodiment.

In the present embodiment, only the second surface member 24 is attached to the attachment surface 13A and molding process is conducted in the same manner as the first embodiment.

According to the present embodiment, functions and effects similar to the first embodiment can be achieved. Furthermore, since the slide die 13 is only required to be configured corresponding to the surface member 24, no special component is required so that the number of parts can be reduced and arrangement can be simplified.

[Third Embodiment]

In a molding die 6 according to the present embodiment shown in FIG. 8, the movable central die plate 123 of the molding die 1 of the first embodiment is integrated with the slide die 13. The same component as in FIG. 1 to FIG. 7 is applied with the same reference numerals to omit detailed explanation, and only different parts will be described below in detail.

The molding die 6 according to the present invention has no second surface member 24 of the laminated molding 2 shown in FIG. 2, i.e. for molding an air current control valve having only the first surface member 23 laminated onto the molding body 20.

The movable die 12 is formed in a cylindrical shape by connecting the frame-shaped movable backing plate 121 and the movable peripheral die plate 122 and has a rectangular opening 120 at the central portion thereof.

Incidentally, the movable die 12 is not restricted to those composed of a plurality of members but may be integrally formed.

A slide die 14 is provided to the opening 120 to be slidable along the wall thereof.

The slide die 14 according to the present embodiment is formed in a block-shape of approximate rectangular solid and has a molding surface corresponding to entire surface of the other side of the molding body 20 (a side opposite to the first surface member 23).

The slide die 14 is fixed to the flat movable-side advancing plate 131 of the present embodiment, and advances and retracts relative to the cavity 10A by the advancement and retraction of the movable-side advancing plate 131 in the same manner as the first embodiment.

According to thus arranged present embodiment, the molding process is conducted in the same manner as the aforesaid first embodiment except that only the first surface member 23 is attached to the attachment surface 11A of the stationary die plate 312.

At this time, when the slide die 14 is advanced approximately simultaneously with the completion of injecting the molten resin as in the first embodiment, since the thickness of the entire cavity 10A is reduced, the molten resin in the cavity 10A can be equally compressed.

According to the present embodiment, the same function and effects can be obtained as in the first embodiment. Additionally, since the slide die 14 is formed in a block-shape corresponding to the entire surface of the other side of the molding body 20, the configuration of the slide die 14 and movable die 12 onto which the slide die 14 is formed can be simplified. Further, since the molten resin can be compressed equally, the molten resin can be securely filled into the entire cavity 10A, thereby obtaining products having high quality corresponding to the cavity 10A.

[Fourth Embodiment]

Figure 9:
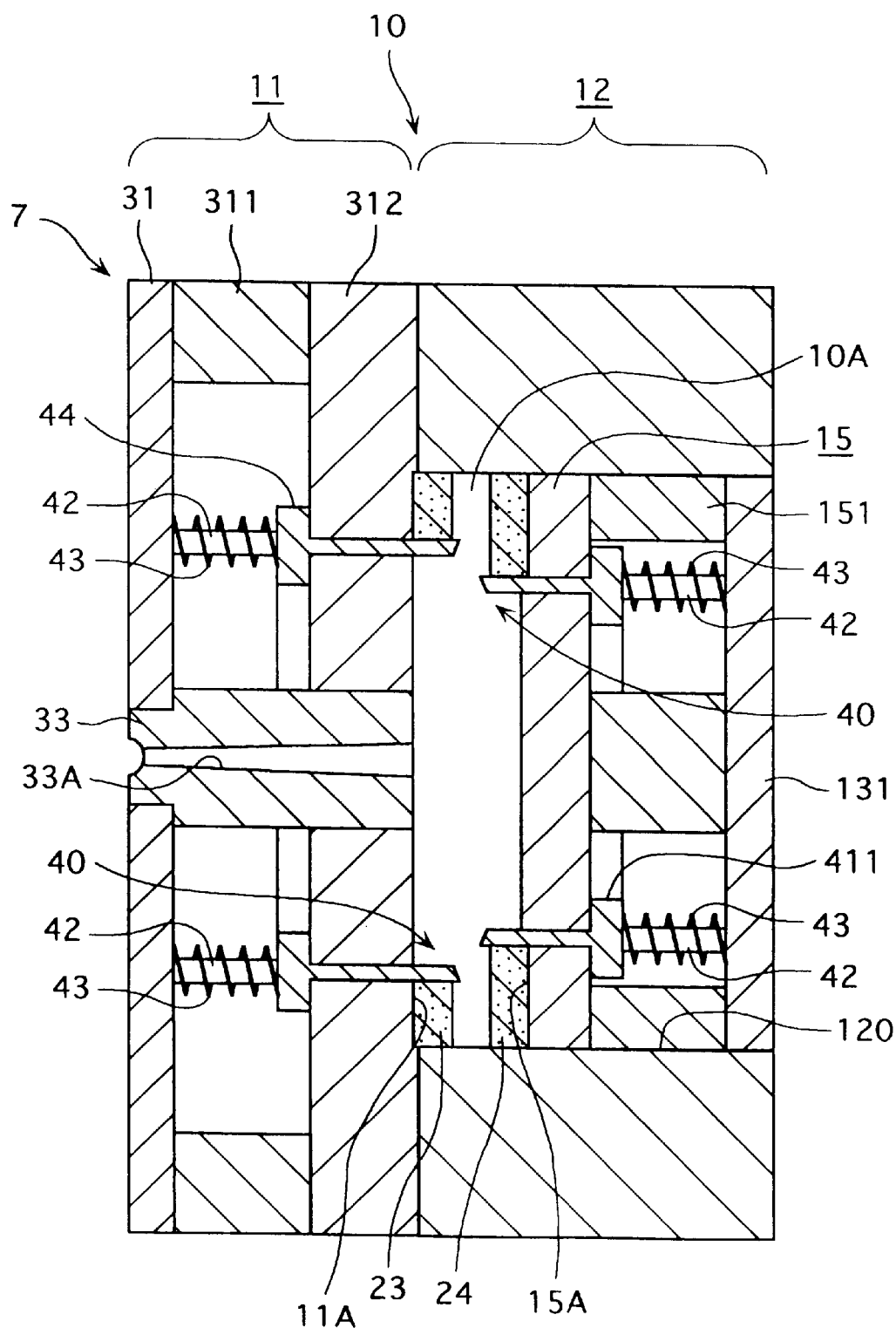
FIG. 9 is a cross section showing fourth embodiment of the present invention.

In the molding die 7 according to the present embodiment shown in FIG. 9, all of the flow-regulating portion of the first embodiment is composed of the flow-regulating plates 40 advancing and retracting independently. The same reference numerals are applied to the same component as in FIG. 1 to 8 to omit detailed explanation, and only different parts will be described below in detail.

The movable die 12 according to the present embodiment has the rectangular opening 120 and is formed in a cylindrical shape. The slide die 15 according to the present embodiment is formed in a rectangular flat-shape slidable along the wall of the opening 120.

The slide die 15 is fixed to the flat movable-side advancing plate 131 of the present embodiment through a spacer 151, which advances and retracts relative to the cavity 10A by the advancement and retraction of the movable-side advancing plate 131 as in the first embodiment.

Incidentally, the pushing rod 132 of the first embodiment is omitted.

The slide die 15 has a molding surface corresponding to the other side of the molding body 20 (a surface on the second surface member 24 side), an outer peripheral portion of the molding surface being an attachment surface 15A for attaching the second surface member 24.

The slide die 15 has a flow-regulating plate 40 approximately identical with the flow-regulating plate 40 of the stationary die plate 312 to cover the inner peripheral side of the second surface member 24 disposed on the frame-shaped attachment surface 15A.

The flow-regulating plate 40 of the slide die 15 is slidable along the slide shaft 42 by being integrated with the advancing plate 411 in the same manner as the flow-regulating plate 40 on the stationary die plate 312 side and is biased in a direction projecting into the cavity 10A by the spring 43.

Incidentally, the biasing force of the spring 43 of the present embodiment is set lower than the spring in the first embodiment.

A distal end surface in the projecting direction of the flow-regulating plate 40 of the present embodiment has a tapered surface going down toward the inside of the first and the second surface members 23 and 24 so that the molten resin can easily flows beyond the flow-regulating plate 40.

Incidentally, the distal end surface of the flow-regulating plate 40 may have a convex portion projecting in the projecting direction thereof. In this case, since only the convex portion of the distal end surface touches the molding surface even when the distal end of the flow-regulating plate 40 touches the molding surface or the surface member 24 to divide the cavity 10A by the flow-regulating plate 40, a channel intersecting the flow-regulating plate 40 can be fixed adjacent to the convex portion so that the molten resin can be allowed to flow toward the first and the second surface member 23 and 24 side beyond the flow-regulating plate 40.

According to thus arranged present embodiment, the molding process is conducted in approximately the same manner as in the first embodiment.

At this time, when the slide die 15 is advanced approximately simultaneously with completion of injecting the molten resin, the resin pressure of the cavity 10A is increased and the flow-regulating plate 40 is pressed by the resin pressure. Accordingly, the respective flow-regulating plates 40 move (retract) to sink relative to the cavity 10A to be approximately flat with the molding surface of the respective dies 11 and 15 when the advancement of the slide die 15 is completed, i.e. in the most retracted condition.

According to the present embodiment, the same function and effects can be obtained and, additionally, since a special mechanism for interlocking the flow-regulating plate 40 with the advancement of the slide die 15 is unnecessary, thereby simplifying the entire arrangement can be simplified.

[Fifth Embodiment]

Figure 10:
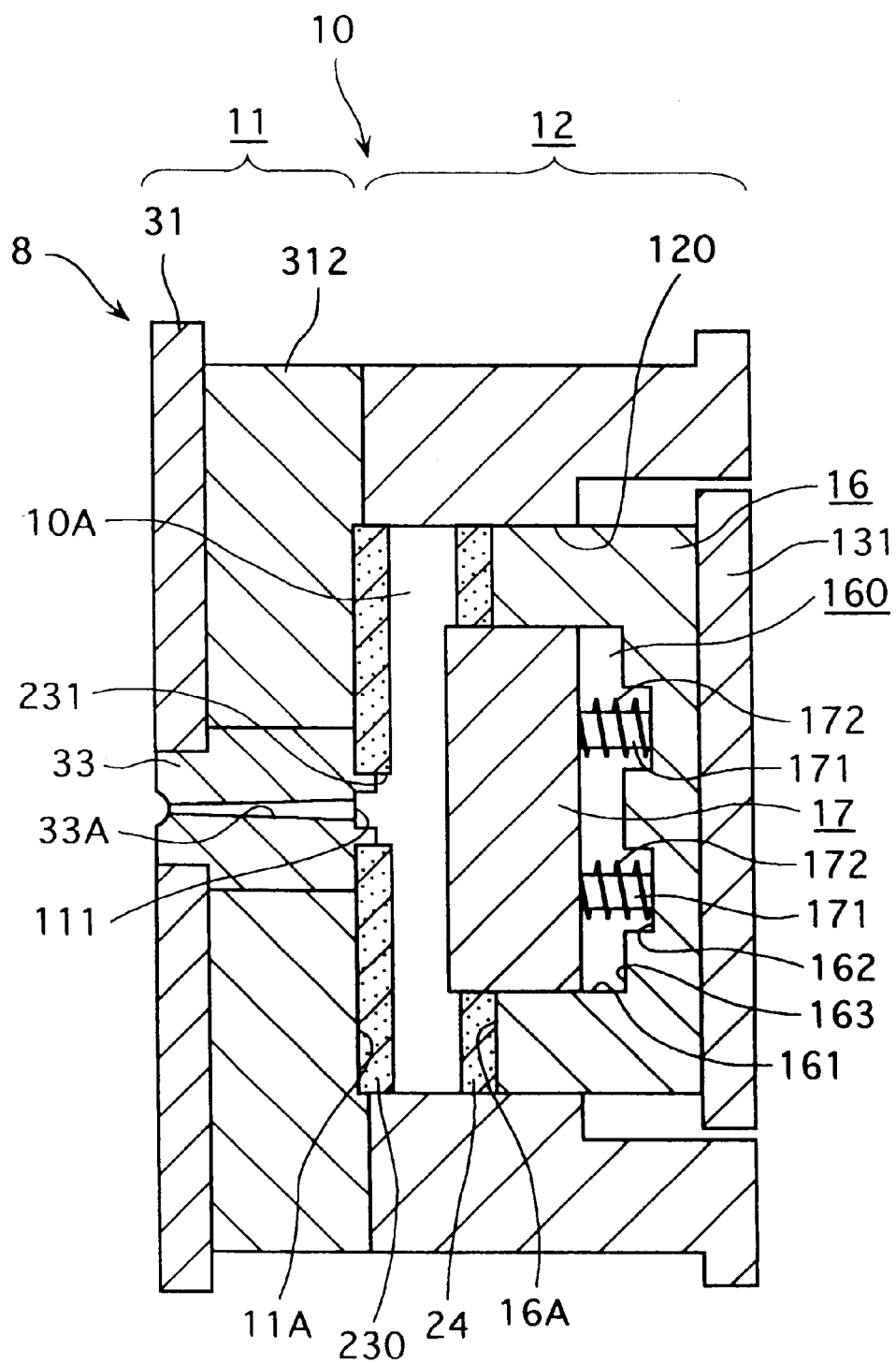
FIG. 10 is a cross section showing fifth embodiment of the present invention.

The molding die 8 according to the present embodiment shown in FIG. 10 has approximately the same arrangement as in the molding die 1 of the first embodiment except for the omission of the flow-regulating plate 40 on the stationary die 11 side and arrangement of the slide die. Accordingly, the same reference numerals are applied to the same component to omit detailed explanation thereof and only different part will be described below in detail.

Figure 11:
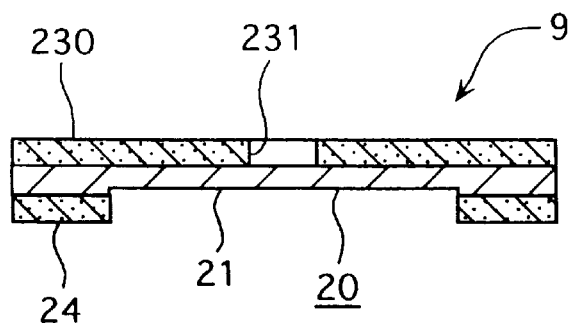
FIG. 11 is a cross section showing a laminated molding according to the fifth embodiment.

The molding die 8 according to the present embodiment is for molding a laminated molding (air current control valve) 9 shown in FIG. 11.

The laminated molding 9 has a flat first surface member 230 on an entire surface on one side of the molding body 20 and the second surface member 24 is partially attached to the other side.

A central portion corresponding to a gate of the first surface member 230 has a gate hole 231.

Back to FIG. 10, the stationary die plate 312 according to the present embodiment is directly attached to the stationary platen 31 and the flow-regulating plate 40, the stationary-side advancing plate 41, the slide shaft 42, the spring 43 and the retracting rod 44 of the first embodiment (see FIG. 1) are not provided. Further, the pushing rod 132 of the first embodiment is omitted.

The movable die 12 has a rectangular opening 120 and is formed in a cylindrical shape. The slide die 16 according to the present embodiment is formed in a block-shape slidable along the wall of the opening 120.

The slide die 16 is fixed to the flatly shaped movable-side advancing plate 131 and can be advanced and retracted relative to the cavity 10A by the advancement and retraction of the movable-side advancing plate 131 in the same manner as the first embodiment.

An outer periphery of the molding surface of the slide die 16 is an attachment surface 16A for attaching the second surface member 24.

In the molding surface of the slide die 16, the rectangular portion surrounded by the frame-shaped attachment surface 16A has a recessed portion 160, to which a compression core 17 is provided projecting into the cavity 10A from the attachment surface 16A of the slide die 16.

The compression core 17 is formed in a block-shape slidable along a wall 161 of the recessed portion 160 and is connected to a bottom 162 of the recessed portion 160, i.e., a bottom 162 in a sliding direction of the compression core 17, through the slide pin 171.

The slide pin 171 is parallel to the advancing direction of the slide die 16. An end of the slide die is fixed to the bottom 162 of the recessed portion 160 and the other end is connected protrudably into the compression core 17.

A spring 172 is wound to the slide pin 171 and the compression core 17 is biased in a direction separating from a bottom 163 of the recessed portion 160, i.e. in projecting direction toward the cavity 10A, to be protruded from the attachment surface 16A beyond the thickness of the second surface member 24.

The peripheral side of the second surface member 24 is covered by the compression core 17 protruding from the attachment surface 16A, so that the flow of the molten resin flowing toward the second surface member 24 on the same plane as the second surface member 24 is regulated.

In other words, the flow-regulating portion for regulating the flow of the molten resin flowing toward the second surface member 24 is composed of the compression core 17 in the present embodiment.

In thus arranged present embodiment, the laminated molding 9 is manufactured according to the following process.

As shown in FIG. 10, the die body 10 is opened and the slide die 16 is retracted relative to the movable die 12 in advance.

At this time, the compression core 17 is spaced apart from the bottom 163 of the recessed portion 160 to be projected from the attachment surface 16A of the slide die 16 beyond the thickness of the second surface member 24 relative to the cavity 10A.

The first surface member 230 is attached to the entire molding surface of the stationary die plate 312 and the gate hole 231 is interconnected to the gate 111 of the stationary die 11.

Further, the second surface member 24 is fitted and attached to the attachment surface 16A surrounded by the movable die 12 and the compression core 17.

Figure 12:
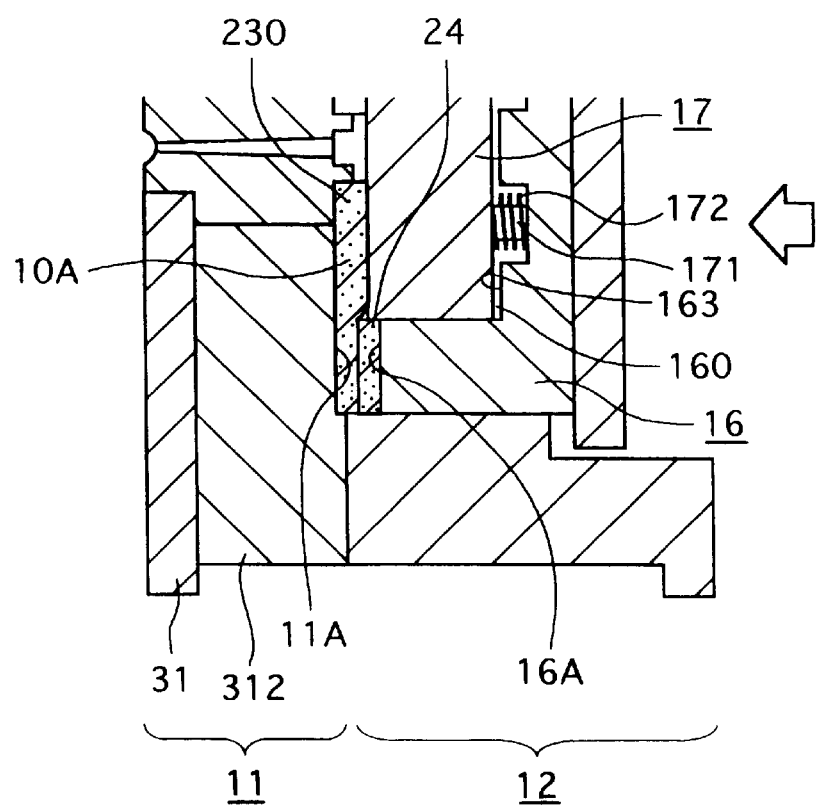
FIG. 12 is a cross section showing a condition where a slide die of the fifth embodiment is advanced.

Subsequently, the die body 10 is closed and the slide die 16 is advanced by a predetermined distance toward the cavity 10A as shown in FIG. 12 to sandwich the first and the second surface members 230 and 24 by the stationary die plate 312, the slide die 16 and the compression core 17.

At this time, when the slide die 16 is advanced to the stationary die 11 (cavity 10A), the compression core 17 and the slide pin 171 are sandwiched between the stationary die plate 312 and the slide die 16, so that the spring 172 is compressed to sink the compression core 17 the recessed portion 160 of the slide die 16. In other words, the compression core 17 does not follow the advancement of the slide die 16 and is accommodated into the recessed portion 160 of the advancing slide die 16.

When the advancement of the slide die 16 is completed, the compression core 17 is slightly projected beyond the attachment surface 16A.

Figure 13:
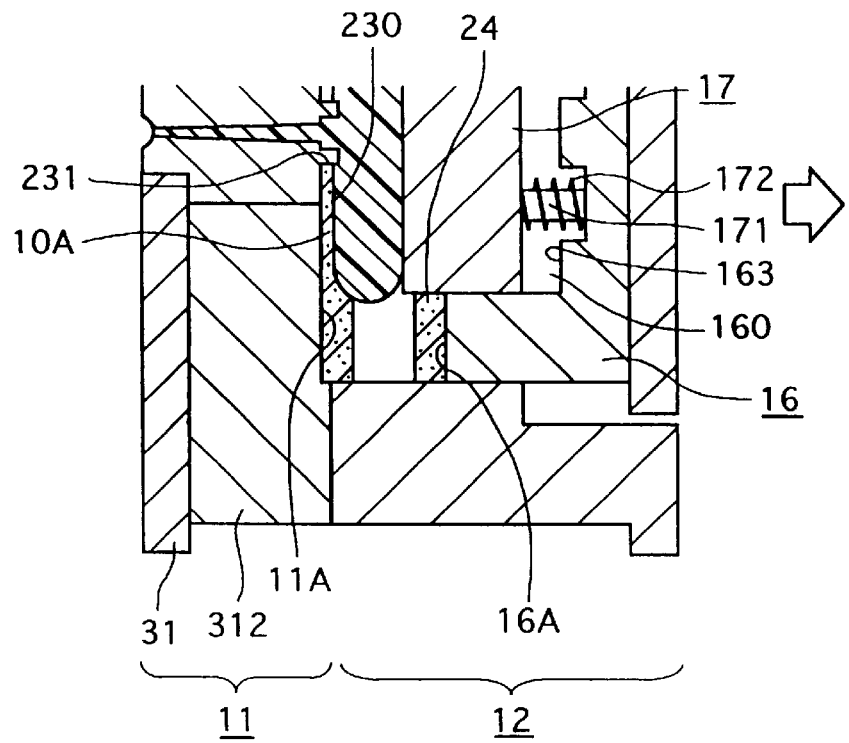
FIG. 13 is a cross section showing a condition where a slide die of the fifth embodiment is retracted.

Simultaneously with, or immediately after initiation of injecting the molten resin, the slide die 16 is retracted as shown in FIG. 13.

Then, the compression core 17 is retracted to the cavity 10A following the retraction of the slide die 16 and is relatively projected by the biasing force of the spring 172, so that the projecting portion covers the inner peripheral side of the second surface member 24.

The molten resin is flown into a space between the first surface member 230 and the compression core 17 from the gate hole 231 of the compressed first surface member 230 to be flown and dispersed along the molding surface of the compression core 17 and the first surface member 230 (surface on the compression core 17 side).

The dispersing molten resin is flown into the surface of the second surface member 24 from the molding surface of the compression core 17, so that the first and the second surface members 230 and 24 are compressed by the resin pressure.

At this time, the peripheral side of the first and the second surface members 230 and 24 are covered by the respective molding surfaces of the stationary die 11 and the movable die 12 and the compression core 17, thereby being shut from the flow of the molten resin.

Figure 14:
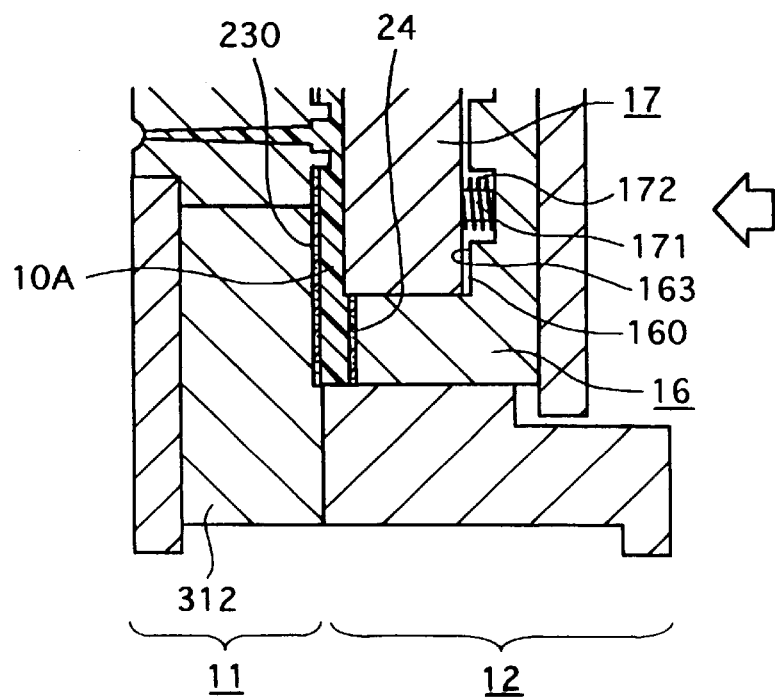
FIG. 14 is a cross section showing a condition where a slide die of the fifth embodiment is re-advanced.

And approximately simultaneously with the completion of injecting the molten resin, more specifically, either one of simultaneously with, immediately before completion or immediately after completion of injecting the molten resin, the slide die 16 is advanced toward the cavity 10A to compress the molten resin to be completely filled in the cavity 10A to render shape, as shown in FIG. 14.

At this time, the compression core 17 advances following the slide die 16 and, as described above, sink into the recessed portion 160, which ordinarily sinks until abutting the bottom 163 of the recessed portion 160. When the advancement of the slide die 16 is completed, the compression core 17 is slightly protruded from the attachment surface 16A.

When the molten resin is cooled and solidified, the dies are opened to eject the molding body 20 (see FIG. 11) having the surface member 230 and 24 integrated thereto.

According to the present embodiment, following effects can be obtained as well as the same function and effects as in the aforesaid first embodiment.

Since the portion adjacent to the gate hole 231 of the first surface member 230 is compressed by advancing the slide die 16 and the cavity 10A is enlarged by retracting the slide die 16 simultaneously with or immediately after the initiation of injecting the molten resin, the molten resin can be easily flown into a space between the first surface member 230 and the molding surface of the retracting compression core 17, thereby securely introducing the molten resin into the space between the first surface member 230 and the compression core 17. Accordingly, the molten resin can be prevented from flowing onto a side of the first surface member 230 facing the stationary die 11 as a design surface of the laminated molding 9, thereby decreasing production rate of inferior goods.

Since the slide die 16 has the compression core 17 protruding from the attachment surface 16A, the compression core 17 having outer shape corresponding to inner peripheral side of the second surface member 24, the inner peripheral side of the second surface member 24 can be securely covered, thereby securely preventing the resin lap at the inner peripheral side of the second surface member 24.

Since the compression core 17 is biased in projecting direction from the attachment surface 16A by the spring 172 to be protrudable relative to the slide die 16, the compression core 17 can be sunk into the slide die 16 by merely advancing the slide die 16 to compress, and can be protruded from the slide die 16 only by retracting the slide die 16. Accordingly, no special arrangement and devices are required for advancing and retracting the compression core 17, so that the arrangement of the molding die 8 can be simplified and can be manufactured inexpensively.

[Modifications]

Incidentally, the scope of the present invention is not limited to the aforesaid embodiments, but includes other arrangement for attaining the object of the present invention, which, for example, includes the following modifications.

Though the flow-regulating plate according to the first, third and the fourth embodiment is interlocked with open and shut of the die body and advancement and retraction of the slide die, the flow-regulating plate may be independently advanced and retracted by providing a driving means such as hydraulic cylinder.

According to the above arrangement, the timing for retracting the flow-regulating plate can be freely set in accordance with a condition such as resin flowability.

Though the slide dies 13 to 16 in the aforesaid respective embodiments are driven by an outside advancing mechanism (not shown), the advancing mechanism may be provided inside the movable die 12 or, alternatively, may be provided to a space between the movable die plate for fixing the movable die to open and close the die, or may be formed on the outside.

Further, the slide die 13 may be provided on the stationary die 11.

Though an air-current control valve having surface member laminated on an outer peripheral portion is manufactured in the above-described embodiments, a position for attaching the surface member onto the laminated molding is not restricted. The surface member of the laminated molding may be laminated on the central portion of the molding body, or a plurality of surface member may be intermittently attached to the molding body.

The laminated molding is not limited to the air-current control valve, but may be automobile air-cleaner case having surface member as a sealing member laminated on an peripheral portion of the opening, a refrigerator door having surface member as a sealing member laminated in frame-shape thereonto, and automobile interior component such as door trim and inner panel. In other words, any product is possible as long as a compressible surface member is partially laminated onto a molding body composed of synthetic resin.

The effects of the present invention will be described below according to specific experiments.

EXAMPLE 1

The present example is an experiment for manufacturing an air-current control valve having the first and the second surface members integrated on both sides of the molding body (160 mm×110 mm, thickness 3.0 mm) by an injection compression molding method according to the first embodiment.

Following specific material, molding machine, molding die and molding condition were used in the present example.
(1) Material
① Synthetic resin
material: polypropylene
(IDEMITSU PP J-2000GP manufactured by IDEMITSU PETROCHEMICAL Co., Ltd)
MI (melt index): 21 g/10min (230 degrees, 2.16 kg load)
② Surface member
material of surface member: foamed urethane (thickness 8.0 mm, expansion ratio approx. 30)
outer dimension of the first surface member: 160 mm×110 mm
opening dimension of the first surface member: 140 mm×90 mm
outer dimension of the second surface member: 160 mm×110 mm
opening dimension of the second surface member: 126 mm×76 mm
(2) Molding machine
A general-purpose horizontal injection molding machine (clamping force: 80t, manufactured by NISSEI PLASTIC INDUSTRIAL Co., Ltd) having a movable die plate installed with a compression device (driving device) for advancing and retracting the slide die was used.

Incidentally, the compression force of the molding machine is continuously adjustable within the range from 0 to 100%.
(3) Molding die
① Thickness of flow-regulating plate: 4 mm
② Maximum projecting dimension of the flow-regulating plate: 10 mm
③ Retracting position of the slide die: a position being sunk by 15 mm from the molding surface of the movable central die plate
(4) Molding condition
① Molding temperature: 200 degrees
② Die temperature: 30 degrees
③ Injection time: 1.6 second
④ Resin injection pressure: 80 kg/cm2 (gauge pressure)
⑤ Cooling time: 40 seconds
⑥ Compression amount of the slide die: 15 mm (advancing amount of the slide die)
⑦ Compression initiating timing: simultaneously with completion of injection (timing for initiating the advancement of the slide die)
⑧ Compression speed: 5 mm/sec. (slide die advancing speed)
⑨ Compression force: 5t

EXAMPLE 2

The present example is an experiment for manufacturing the air-current control valve according to the second embodiment.

In the present example, the same material, molding machine, molding die and molding condition as the Example 1 was used except that the compression amount of the slide die was 10 mm.

Comparison 1

In the present comparison, an air-current control valve was obtained in the same manner as the Example 1 except that the molding process was conducted by an injection molding method using a conventional die, i.e., die having no flow-regulating plate and the slide die.

In other words, the die used in the present comparison had a cavity having approximately the same configuration as the cavity formed in the molding die of the Example 1 when the slide die was advanced. The molten resin was not compressed during molding process.

Result of Experiments

Average thickness of the surface members of the air-current control valve was 7.1 mm in the Example 1 and 7.3 mm in the Example 2. And since the air-current control valves obtained in the respective examples had no collapse, wrinkle and position shift of the surface member and the peripheral end portion of the surface member had no appearance failure by the resin lap, it can be observed that an air-current control valve having superior quality such as sealability and good appearance could be obtained.

In contrast thereto, in Comparison 1, since the resin lap was caused at the inner peripheral end portion of the surface member and, furthermore, the surface member was drugged by the resin flow to be pushed out of the molding body to be integrated, it can be observed that no air-current control valve having good quality and appearance could be obtained.

INDUSTRIAL AVAILABILITY

As described above, the molding die of the laminated molding and the manufacturing method of the molding according to the present invention are suitably used for a laminated molding having a molding body with a compressible surface member laminated thereto, more specifically, a laminated molding having synthetic resin made molding body integrated with the surface members such as an air-current control valve of an automobile air-conditioner, a portion adjacent to automobile air cleaner case and periphery of inside of the refrigerator door, and molding die therefor.

What is claimed is:

1. A molding die of a laminated molding for manufacturing a laminated molding having a molding body made of synthetic resin with a compressible surface member partially laminated thereonto, comprising:
   a die body having a cavity for molding the laminated molding and being capable of attaching the surface member thereinside;
   a slide die structuring the die body and being advanceable and retractable relative to the cavity; and
   a flow-regulating portion provided to the die body for regulating a flow of a molten resin flowing toward the surface member during compression of the surface member.

2. The molding die of a laminated molding according to claim 1, wherein the flow-regulating portion comprises a plate-shaped flow-regulating plate, the flow-regulating plate being protrudable relative to the cavity.

3. The molding die of a laminated molding according to claim 2, wherein the flow-regulating plate is continuously formed along a portion of a peripheral side of the surface member being exposed in the cavity.

4. The molding die of a laminated molding according to claim 3, wherein the surface member is formed with a frame-shape, and wherein the flow-regulating plate is provided along an inner peripheral side of the surface member.

5. The molding die of a laminated molding according to claim 1, wherein the surface member is formed with a frame-shape and is attached to a molding surface of the slide die, the slide die being formed with a frame-shape corresponding to the surface member; and wherein an inner portion of the slide die of the die body is aligned with the flow-regulating portion.

6. The molding die of a laminated molding according to claim 1, wherein the surface member is formed in a frame-shape and is attached surrounding the slide die; and wherein the slide die is formed in a block-shape corresponding to an opening of the surface member, the slide die being aligned with the flow-regulating portion.

7. A molding method for shaping a laminated molding having a molding body made of synthetic resin and a compressible surface member partially laminated thereto, comprising the steps of:

providing a molding die comprising a die body having a cavity for molding the laminated molding thereinside, a slide die of the die body being advanceable and retractable relative to the cavity, and a flow-regulating portion of the die body for regulating a flow of a molten resin flowing toward the surface member;

attaching the surface member to an inner surface of the die body;

after attaching the surface member, injecting the molten resin into the cavity; and subsequently, advancing the slide die relative to the cavity, wherein the molten resin compresses the surface member.

8. The method of shaping a laminated molding according to claim 7, wherein, simultaneously with advancing the slide die to the cavity, the flow-regulating portion is retracted relative to the cavity.

9. The method of shaping a laminated molding according to claim 7, wherein the surface member is attached to a portion of the inner surface of the die body, another portion of the inner surface being free from the surface member.

10. A molding method for shaping a laminated molding having a molding body made of synthetic resin and a compressible surface member partially laminated thereto, by using a molding die including a die body having a cavity for molding the laminated molding hereinside, the molding die including a stationary die and a movable die, the movable die including a slide die advanceable and retractable relative to the stationary die, the molding die including a flow-regulating portion for regulating a flow of he molten resin toward the surface member, the method comprising the steps of:

opening the molding die;

attaching the surface member to an inner surface of the molding die;

closing the molding die;

injecting molten resin into the cavity, wherein the molten resin compresses the surface member, and removing the laminated molding from the molding die, enabling the compressible surface member to expand.

11. The method of shaping a laminated molding according to claim 10, including the steps of:

advancing the slide die into the cavity, and retracting the flow-regulating portion from the cavity.

12. The method of shaping a laminated molding according to claim 11, wherein the steps of advancing of the slide die and of retracting of the flow-regulating portion occur simultaneously.

13. The method of shaping a laminated molding according to claim 10, wherein the step of attaching the surface member includes attaching an additional compressible surface member to an opposing inner surface of the molding die.

14. The method of shaping a laminated molding according to claim 13, wherein the laminated molding includes the compressible surface members partially laminated thereto on opposing sides thereof.

15. The method of shaping a laminated molding according to claim 10, wherein the step of attaching the surface member includes attaching the compressible surface member to a portion of the inner surface of the molding die so that only a portion of the laminated molding supports the compressible surface member.

16. The method of shaping a laminated molding according to claim 15, wherein an opposing inner surface of she laminated molding is free from a compressible surface member.

17. The method of shaping a laminated molding according to claim 10, wherein the flow-regulating portion comprises a retractable flow-regulating portion, the method including the step of moving the flow-regulating portion to a position adjacent an edge of the surface member to prevent injected molten resin from causing resin lap at the edge of the surface member to prevent position shifting of the surface member during the injection of the molten resin.

* * * * *